US012330907B2

(12) United States Patent
Kallioniemi et al.

(10) Patent No.: US 12,330,907 B2
(45) Date of Patent: Jun. 17, 2025

(54) OPERATIONAL ENTITY AND A MULTICAR ELEVATOR SYSTEM FOR CONTROLLING MOVEMENT OF A PLURALITY OF ELEVATOR CARS OF A MULTICAR ELEVATOR SYSTEM

(71) Applicant: Kone Corporation, Helsinki (FI)

(72) Inventors: Antti Kallioniemi, Helsinki (FI); Antti Saarelainen, Helsinki (FI); Paul Karlstedt, Helsinki (FI)

(73) Assignee: Kone Corporation, Helsinki (FI)

( * ) Notice: Subject to any disclaimer, the term of this patent is extended or adjusted under 35 U.S.C. 154(b) by 1573 days.

(21) Appl. No.: 16/598,227

(22) Filed: Oct. 10, 2019

(65) Prior Publication Data

US 2020/0140233 A1 May 7, 2020

(30) Foreign Application Priority Data

Nov. 6, 2018 (EP) .................................... 18204495

(51) Int. Cl.
*B66B 1/24* (2006.01)
*B66B 1/34* (2006.01)
(Continued)

(52) U.S. Cl.
CPC .......... *B66B 1/2466* (2013.01); *B66B 1/3423* (2013.01); *B66B 1/468* (2013.01);
(Continued)

(58) Field of Classification Search
CPC ....... B66B 9/003; B66B 11/0407; B66B 9/00; B66B 1/2466; B66B 1/2433; B66B 1/468;
(Continued)

(56) References Cited

U.S. PATENT DOCUMENTS

2008/0067013 A1 3/2008 Ylinen et al.
2012/0037461 A1 2/2012 Finschi
2018/0022573 A1* 1/2018 Hsu ........................ B66B 5/0087 187/247

(Continued)

FOREIGN PATENT DOCUMENTS

CN 103492299 A 1/2014
CN 107200245 A * 9/2017 ............... B66B 1/06

(Continued)

OTHER PUBLICATIONS

Chinese Office Action dated Oct. 8, 2022 issued in corresponding Chinese Appln. No. 201911067825.4.
European Search Report for European U.S. Appl. No. 18/204,495 dated May 13, 2019.

*Primary Examiner* — Jeffrey Donels
(74) *Attorney, Agent, or Firm* — Harness, Dickey & Pierce, P.L.C.

(57) ABSTRACT

An operational entity for controlling movement of a plurality of elevator cars of a multicar elevator system includes a user interface having a first input element and a second input element. The user interface generates, on the basis of the first input element, an indication of selection of at least one elevator car from among the plurality of elevator cars to be moved; and generates, on the basis of the second input element, one or more control signals indicative of a request to control the movement of the selected at least one elevator car in a predefined direction. A multicar elevator system including the operational entity is provided.

17 Claims, 3 Drawing Sheets

(51) Int. Cl.
*B66B 1/46* (2006.01)
*B66B 9/00* (2006.01)

(52) U.S. Cl.
CPC ........ *B66B 9/003* (2013.01); *B66B 2201/104* (2013.01); *B66B 2201/4653* (2013.01)

(58) Field of Classification Search
CPC ............ B66B 1/2491; B66B 2201/103; B66B 2201/102; B66B 5/0012; B66B 11/0095; B66B 2201/306; B66B 11/02; B66B 2201/4638; B66B 1/14; B66B 2201/405; B66B 1/36; B66B 2201/226; B66B 11/0213
See application file for complete search history.

(56) References Cited

U.S. PATENT DOCUMENTS

| | | | | |
|---|---|---|---|---|
| 2018/0093860 | A1 | 4/2018 | Saperstein et al. | |
| 2020/0140233 | A1* | 5/2020 | Kallioniemi | B66B 1/3423 |

FOREIGN PATENT DOCUMENTS

| | | | | | |
|---|---|---|---|---|---|
| CN | 107207184 | A | | 9/2017 | |
| CN | 108290703 | A | | 7/2018 | |
| CN | 108622746 | A | | 10/2018 | |
| CN | 110461749 | B | * | 11/2021 | B66B 1/2491 |
| FI | 117091 | B1 | * | 6/2006 | B66B 1/34 |
| JP | 2006103887 | A | * | 4/2006 | |
| WO | WO-2013080242 | A1 | * | 6/2013 | B66B 1/2433 |
| WO | WO-2013164882 | A1 | * | 11/2013 | B66B 1/2433 |

* cited by examiner

OPERATIONAL ENTITY AND A MULTICAR ELEVATOR SYSTEM FOR CONTROLLING MOVEMENT OF A PLURALITY OF ELEVATOR CARS OF A MULTICAR ELEVATOR SYSTEM

RELATED APPLICATIONS

This application claims priority to European Patent Application No. EP18204495.8 filed on Nov. 6, 2018, the entire contents of which are incorporated herein by reference.

TECHNICAL FIELD

The invention concerns in general the technical field of elevators. Especially the invention concerns multicar elevator systems.

BACKGROUND

Multicar elevator system is one elevator type, wherein a plurality of elevator cars travels within the same elevator shafts. One known implementation of the multicar elevator system is such that two or more elevator cars are arranged to travel upwards in one elevator shaft and downwards in another elevator shaft. The elevator cars may be arranged to travel between the shafts through transfer channels which connect the elevator shafts to each other. Another known implementation of the multicar elevator system is such that a plurality of elevator cars is arranged to travel in the same elevator shaft upwards and downwards. The plurality of elevator car is attached to each other to form so called multi-deck elevator system.

The modern multicar elevator systems in which the elevator cars travel in the circular path allow independent motion of the elevator cars within the elevator shafts. The modern multicar elevator systems are typically based on a solution in which the elevator car carries at least part of the elevator motor, such as a linear motor, generating power for moving the elevator car in the elevator shaft.

Hence, there is need to develop further solutions in order to improve at least in part the operation of the multicar elevator system.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present an operational entity and a multicar elevator system for controlling movement of a plurality of elevator cars of a multicar elevator system. Another objective of the invention is that operational entity and the multicar elevator system for controlling movement of a plurality of elevator cars of a multicar elevator system improve at least partly the operation of the multicar elevator system.

The objectives of the invention are reached by an operational entity and a multicar elevator system as defined by the respective independent claims.

According to a first aspect, an operational entity for controlling movement of a plurality of elevator cars of a multicar elevator system is provided, wherein the operational entity having a user interface comprising a first input element and a second input element, the user interface is configured to: generate, on the basis of the first input element, an indication of selection of at least one elevator car from among a plurality of elevator cars to be moved; and generate, on the basis of the second input element, one or more control signals indicative of a request to control the movement of the selected at least one elevator car to a predefined direction.

The user interface may be configured to: generate, in response to activation of the first input element, the indication of selection of at least one elevator car from among a plurality of elevator cars to be moved; generate, in response to simultaneous continuous activation of the second input element, the one or more control signals indicative of a request to control the movement of the selected at least one elevator car to a predefined direction; and generate, in response to inactivation of the second input element, one or more control signals indicative of a request to stop the movement of the selected at least one elevator car.

Alternatively or in addition, the user interface may be configured to: generate, in response to continuous activation of the first input element, the indication of selection of at least one elevator car from among a plurality of elevator cars to be moved; generate, in response to continuous activation of the second input element, the one or more control signals indicative of a request to control the movement of the selected at least one elevator car to a predefined direction; and generate, in response to inactivation of the first input element and/or the second input element, one or more control signals indicative of a request to stop the movement of the selected at least one elevator car.

Alternatively or in addition, the user interface may be configured to: generate, in response to activation of the first input element, an indication of selection of at least one elevator car from among a plurality of elevator cars to be moved; generate, in response to first activation of the second input element, one or more control signals to an elevator control unit indicative of a request to control the movement of the selected at least one elevator car to a predefined direction; and generate, in response to second activation of the second input element, one or more control signals to the elevator control unit indicative of a request to stop the movement of the selected at least one elevator car.

The generated indication may comprise indication of substantially simultaneous selection of two or more elevator cars and the generated one or more control signals may comprise indication of a request to control the movement of the selected two or more elevator cars simultaneously.

Alternatively or in addition, the generated indication may comprise indication of selection of two or more elevator cars each at a time and the generated one or more control signals may comprise indication of a request to control the movement of the selected two or more elevator cars each at a time.

The operational entity may be one of the following: a test and emergency panel arranged outside an elevator shaft, an inspection drive station arranged inside an elevator shaft, a mobile device.

The user interface may further comprise a display configured to display simultaneously location and/or movement information of a plurality of elevator cars.

Alternatively or in addition, the user interface may further comprise a display configured to display simultaneously location and/or movement information of a plurality of selected elevator cars.

The generated one or more control signals may be provided to an elevator control unit of the multicar elevator system.

According to a second aspect, a multicar elevator system for controlling movement of a plurality of elevator cars of a multicar elevator system is provided, wherein the multicar elevator system comprises: a plurality of elevator cars, an elevator control unit for controlling operation of the multicar elevator system at least in part, and an operational entity described above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

Figure 1:
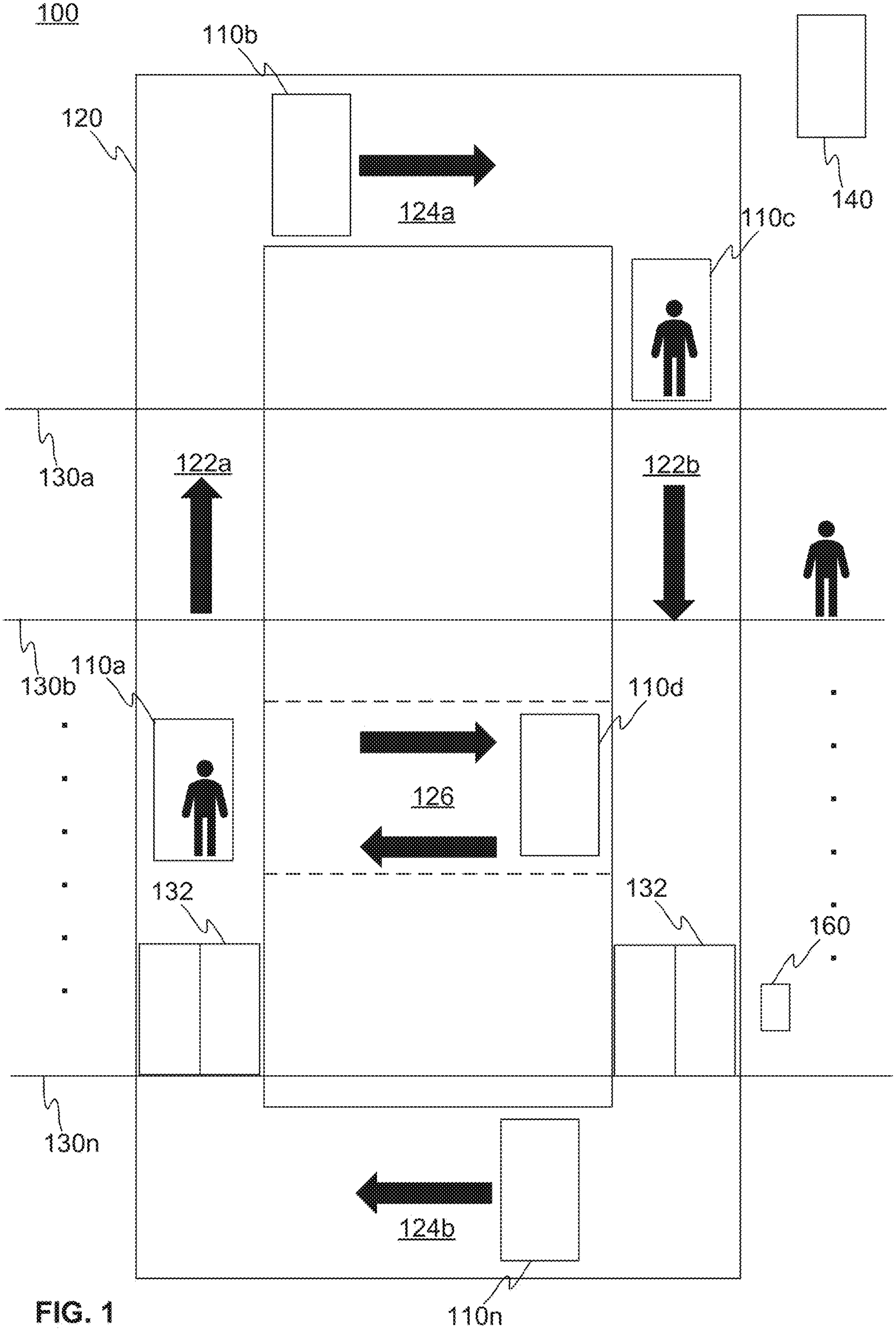
FIG. 1 illustrates schematically an example of a multicar elevator system according to the present invention.

FIG. 1 illustrates schematically an example of a multicar elevator system 100 according to the present invention. The multicar elevator system 100 may comprise a plurality of elevator cars 110*a*-110*n*, a plurality of elevator sub-systems 120, and one or more control entities, e.g. an elevator control unit 140. For example, there may be separate propulsion units for elevator cars and a common elevator control unit which manages travels of different cars between landing floors. Each elevator sub-system may comprise two or more vertical elevator shafts 122*a*, 122*b*, i.e. vertical sections, in which at least one, preferably at least two elevator cars 110*a*-110*n* may travel in a loop path. The loop path refers to an implementation in which the elevator car may travel upwards in one vertical section, such as in a first shaft 122*a*, and downwards in another vertical section, such as in a second shaft 122*b*. The elevator car may be transferred between the vertical sections 122*a*, 122*b* through at least two horizontal sections 124*a*, 124*b*, known also as transfer channels, arranged between the vertical sections. The horizontal sections 124*a*, 124*b*, i.e. transfer channels, may e.g. be arranged at the upper section and at the lower section of the elevator shaft as illustrated in FIG. 1. The multicar elevator system 100 according to the present invention may further comprise one or more reservation shafts 126 into which one or more elevator cars 110*a*-110*n* may be instructed. The one or more reservation shafts 126 may be used for example to store one or more elevator cars which are not operating properly, i.e. there is a malfunction in the one or more elevator cars, for bypassing an elevator car not operating properly, to store extra, e.g. idle elevator cars, and/or to be able to move more elevator cars to serve in the other direction e.g. during a traffic peak. The reservation shaft may be vertical or a horizontal channel, for example.

The power generation means for moving the plurality of elevator cars 102*a*-102*n* in each sub-system 120 may be any suitable means. For example, a linear motor may be used in the context of the present invention. However, the invention is not limited to that only, but any means which may be controlled with a control device for controlling the motion of the elevator car may be ap-plied to. Moreover, even if it is illustrated one elevator sub-system 120 comprising two vertical shafts 122*a*, 122*b* and two transfer channels 124*a*, 124*b*, and one reservation shaft 126 in FIG. 1, the number of sub-systems, vertical shafts, transfer channels, and/or reservation shafts is not anyhow limited in view of an inventive idea of the present idea. The elevator cars 110*a*-110*n* are configured to travel between landings 130*a*-130*n*. In FIG. 1 only landing doors 132 of the bottom landing 130*n* are illustrated, but each landing comprises landing door, which are not illustrated in FIG. 1 for sake of clarity.

The multicar elevator system 100 may comprise one or more control entities configured to control at least some operations of the multicar elevator system 100. In the implementation as illustrated in FIG. 1, the control entity is, as a non-limiting example, an elevator control unit 140, i.e. elevator controller, which may be configured to control an operation of the multicar elevator system 100 at least in part. The elevator control unit 140 may reside for example inside a machine room in shaft or in a lockable control cabinet in a landing. The elevator control unit 140 may be configured to receive input signals and generate output signals to predetermined entities of the multicar elevator system 100, such as elevator call devices, operational entity, power generation means of one or more elevator cars, etc. The elevator control unit 140 may also be configured to communicate with any external entities, such as with a data center configured to monitor and control of the multicar elevator system 100 and/or any sub-systems therein. The communication to and from the elevator control unit 140 may be arranged in a wireless or in a wired manner so that the communication between the entities may be established as described throughout this application.

Figure 2:
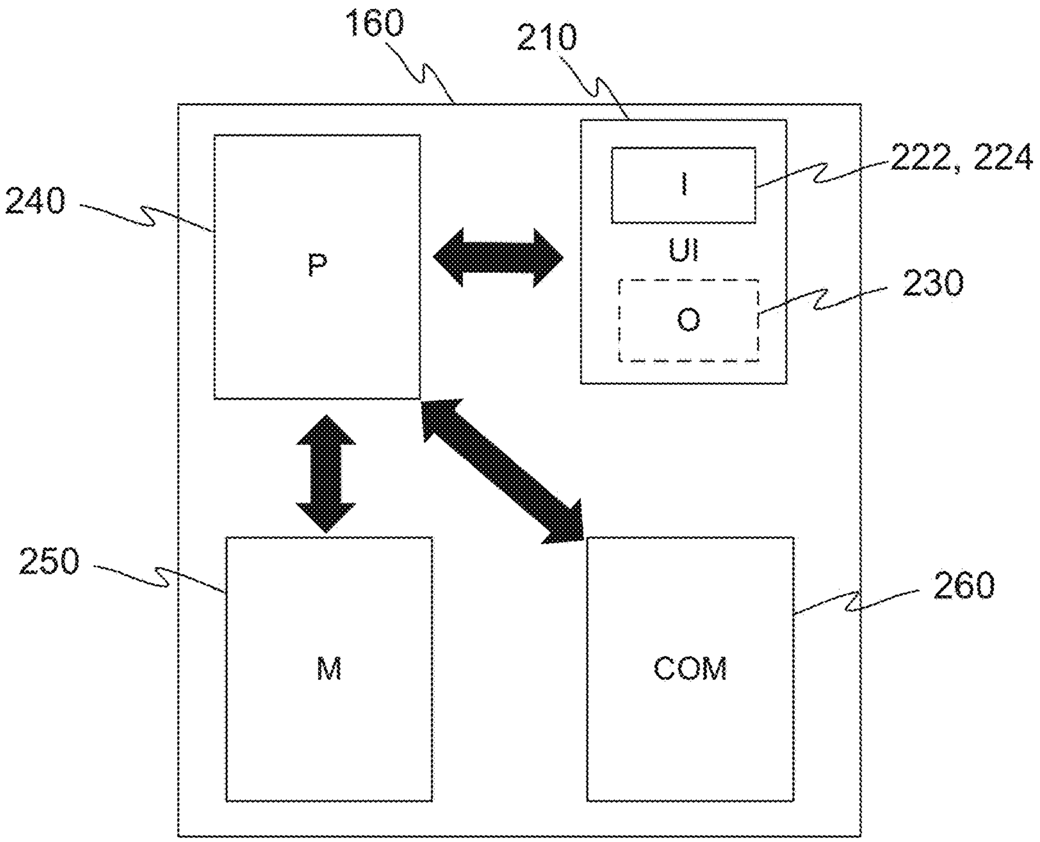
FIG. 2 illustrates schematically an example of entities of the operational entity according to the invention.

The multicar elevator system 100 further comprises an operational entity 160 via which movement of a plurality of elevator cars 110*a*-110*n* of the multicar elevator system 100 may be controlled. FIG. 2 illustrates schematically an example of the entities of the operational entity 160 according to the invention. The operational entity 160 may comprise a user interface 210 for interacting with at least one user. The user interface 210 of the operational entity 160 may comprise one or more input elements 222, 224, such as button(s), keyboard, keypad, touch screen, etc., for receiving user input. The user interface 210 may further comprise one or more output devices 230, such as display, loudspeaker, touch screen, etc., for outputting information. The operational entity 160 may further comprise a processing unit 240 comprising one or more processors, and a memory unit 250 comprising one or more memories. The one or more processors of the processing unit 240 of the operational entity 160 may be any suitable processor for processing information and control the operation of the operational entity 160 at least in partly, among other tasks. The memory unit 250 may store portions of computer program code and any other data, and the processing unit 240 may cause the operational entity 160 to operate as described by executing at least some portions of the computer program code stored in the memory unit 250. The one or more memories are not limited to a certain type of memory only, but any memory type suitable for storing the described pieces of information may be applied in the context of the invention. The operational entity 160 may further comprise a communication unit 260 for providing an interface for communication with any external units or entities of the multicar elevator system 100, such as the elevator control unit 140. The communication to and from the operational entity 160 may be based on at least one known communication technologies, either wired or wireless, in order to exchange pieces of information as described throughout this application. The operational entity 160 may be a separate entity communicatively coupled to the elevator control unit 140 or it may be at least partly integrated with the elevator control unit 140.

The user interface 210 comprises at least a first input element 222 and a second input element 224. The user interface 210 is configured to generate an indication of selection of at least one elevator car from among a plurality of elevator cars to be moved on the basis of a first input element 222, i.e. via a user interaction directed to the first input element 222. Furthermore, the user interface 210 is configured to generate one or more control signals indicative of a request to control the movement of the selected at least one elevator car to a predefined direction, on the basis of a second input element 224, i.e. via a user interaction directed to the second input element 224.

The generated indications and one or more control signals may be provided to the elevator control unit 140 of the multicar elevator system 100. The elevator control unit 140 in turn is configured to control the movement of the selected at least one elevator car by generating one or more control signals to the selected at least one elevator car. The elevator control unit 140 may comprise a processing unit comprising one or more processors, a memory unit comprising one or more memories, a communication unit comprising one or more communication devices, and a user interface (UI). The communication unit may be based on at least one known communication technologies, either wired or wireless, in order to exchange pieces of information. The communication unit provides an interface for communication with any entities of the multicar elevator system 100, such as the operational entity 160 or power generation means of th one or more elevator cars 110*a*-110*n*, or any external units, such as database and/or any external systems. The control signal generated by the elevator control unit 140 may comprise instructions to move to the predefined direction. The control signal may e.g. refer to a signal carrying information for controlling power generation means of the one or more other elevator cars.

Next some examples of the user interactions directed to the input elements 222, 224 of the user interface 210 on basis which the user interface 210 is configured to generate the one or more indications or control signals are discussed. According to an embodiment of the invention, the user interface 210 may be configured to generate the indication of selection of at least one elevator car from among a plurality of elevator cars 110*a*-110*n* to be moved, in response to activation of the first input element 222. The activation of an input element may be for example a push or touch of the input element, e.g. a button or touchscreen, by the user. The activation of an input element 222, 224 means throughout this application a single activation of the input element 222, 224, i.e. the input element 222, 224 is activated and released after the activation. Furthermore, user interface 210 may be configured to generate the one or more control signals indicative of a request to control the movement of the selected at least one elevator car to a predefined direction, in response to continuous activation of the second input element 224 and generate one or more control signals indicative of a request to stop the movement of the selected at least one elevator car, in response to inactivation of the second input element 224. The continuous activation of an input element 222, 224 means throughout this application that the input element 222, 224 is maintained activated until inactivation of the input element 222, 224, i.e. releasing the input element 222, 224. The continuous activation may be for example a continuous push or touch of the input element 222, 224, e.g. a button or touchscreen, by the user, until the input element 222, 224 is inactivated by releasing the input element. In other words, the movement of the at least one elevator car may be controlled via user interface 210 of the operational entity 160 so that the first input element 222 is activated to select the at least one elevator car to be moved and the movement of the selected at least one elevator car is controlled by continuously activating the second input element 224 and when the second input element 224 is inactivated the movement of the selected at least one elevator car is stopped. This means that the selected at least one elevator car is moving only when the second input element 224 is maintained activated.

According to another embodiment, the user interface 210 may be configured to generate the indication of selection of at least one elevator car from among a plurality of elevator cars 110*a*-110*bn* to be moved, in response to continuous activation of the first input element 222. Furthermore, the user interface 210 may be configured to generate the one or more control signals indicative of a request to control the movement of the selected at least one elevator car to a predefined direction, in response to simultaneous continuous activation of the second input element 224, and generate one or more control signals indicative of a request to stop the movement of the selected at least one elevator car, in response to inactivation of the first input element 222 and/or the second input element 224. In other words, the movement of the at least one elevator car may be controlled via user interface 210 of the operational entity 160 so that the first input element 222 is continuously activated to select the at least one elevator car to be moved and the movement of the selected at least one elevator car is controlled via simultaneous continuous activation of the second input element 224 and when the first input element 222 and/or the second input element 224 is inactivated the movement of the selected at least one elevator car is stopped. This means that the selected at least one elevator car is moving only when both first input element 222 and the second input element 224 are maintained activated.

According to another embodiment, the user interface 210 may be configured to generate an indication of selection of at least one elevator car from among a plurality of elevator cars 110*a*-110*n* to be moved, in response to activation of the first input element 222. Furthermore, the user interface 210 may be configured to generate one or more control signals indicative of a request to control the movement of the selected at least one elevator car to a predefined direction, in response to a first activation of the second input element 224, and generate one or more control signals indicative of a request to stop the movement of the selected at least one elevator car, in response to a second activation of the second input element 224. The first activation of the second input element 224 and the first activation of the input element 222 are single activations.

In case two or more elevator cars are selected to be moved, the generated indication may comprise indication of substantially simultaneous selection of two or more elevator cars in order to select two or more elevator cars to be moved simultaneously. In that case, the generated one or more control signals may comprise indication of a request to control the movement of the selected two or more elevator cars simultaneously. The substantially simultaneous selection means that the two or more elevator cars may be selected simultaneously or successively before generation of the one or more control signals indicative of a request to control the movement of the selected two or more elevator cars. Simultaneous control of the movement of the selected two or more elevator cars means that the two or more elevator cars are controlled to be moved simultaneously, i.e. to the same direction in relation to each other, with the same speed, etc. For example, if two elevator cars are needed to be moved simultaneously via the user interface 210 of the operational entity 160, the selection of the first elevator car and second elevator car are provided first and after the selection of the elevator cars the movement of the first elevator car and the movement of second elevator car are provided simultaneously. This enables that the movement of two or more elevator cars may be controlled simultaneously. Furthermore, the two or more selected elevator cars may be controlled to move to the same direction in relation to each other.

Alternatively, the generated indication may comprise indication of selection of two or more elevator cars each at a time. In this case, the generated one or more control signals may comprise indication of a request to control the movement of the selected two or more elevator cars each at a time. For example, if two elevator cars are needed to be moved via the user interface 210 of the operational entity 160, the selection of the first elevator car and the movement of the first elevator car are provided first and after the movement of the first elevator car, the selection of the second elevator car and the movement of the second elevator car are provided. This enables that the two or more selected elevator cars may be controlled to move to the same direction or to different directions in relation to each other. Furthermore, this enables that the two or more selected elevator cars may be controlled to move with the same speed or with different speed in relation to each other.

According to an embodiment of the invention, the operational entity may comprise one or more output devices 230, e.g. a display, at least for indicating simultaneously location and/or movement information, such as speed and/or direction, of a plurality of selected elevator cars. In some embodiments, the operational entity 160 may comprise one or more output devices 230, e.g. a display, for indicating simultaneously location and/or movement information, such as speed and/or direction, of all elevator cars inside the same elevator shaft, reservation channel, and/or transfer channel. This enables that collisions may be prevented, if the serviceman who is manually driving elevator car(s) via the operational entity 160 as described may also see location and/or movement information of other elevator cars in addition to the location and/or movement information of the selected at least one elevator car from the display.

According to an embodiment of the invention, the operational entity 160 may be a test and emergency panel arranged outside the elevator shaft as illustrated in FIG. 1. The test and emergency panel may be used for example for performing so called rescue drive, i.e. in emergency situations to rescue passengers trapped inside a stopped elevator car. The rescue drive is performed with reduced speed so that the stopped elevator car is controlled via the test and emergency panel to move to a predefined destination landing, such as the closest landing or the bottom landing 130*n*. Alternatively or in addition, the test and emergency panel may be used for example for performing a test drive. The test drive of the elevator system may comprise for example tests of traction, safety gear, buffer, ascending car overspeed protection means, unintended car movement protection, rupture valve, restrictor, pawl device, cushioned stop, pressure, etc. The test and emergency panel is arranged outside the elevator shaft, for example inside a machine room of the elevator system or at a landing, such as the bottom landing 130*n* or top landing 130*a*, to enable that the test and emergency operations may be carried out via the panel from outside the shaft. The test and emergency panel shall be accessible to authorized persons only. The test and emergency panel may be communicatively coupled via the communication unit 240 to the elevator control unit by any known wired or wireless manner.

According to an embodiment of the invention, the operational entity 160 may be an inspection drive station arranged inside the elevator shaft (not shown in FIG. 1), for example to a pit of the elevator shaft or to the roof of one elevator car 110*a*-110*n*. The inspection drive station may be used for example in an inspection drive preformed from inside the elevator shaft. The inspection drive is performed with reduced speed during for example maintenance or installation of the elevator system. The inspection drive station shall be accessible to authorized persons only. A lockable housing may be arranged e.g. to the pit or the roof of one elevator car for accommodating the inspection drive station, when the inspection drive station is not in use. The normal operation of the elevator car may be allowed only when the inspection drive station resides inside the housing and when the inspection drive station is outside the housing the inspection drive operation is allowed. The inspection drive station may be communicatively coupled via the communication unit 240 to the elevator control unit 140 by any known wired or wireless manner.

According to an embodiment of the invention, the operational entity 160 may be a mobile device, such as a mobile phone, tablet computer, etc., (not shown in FIG. 1). The mobile device may be used to manually control the movement of the plurality of the elevator cars of the multicar elevator system 100. The movement may be rescue drive or inspection drive performed with reduced speed or any other movement of the elevator car.

Figure 3A:
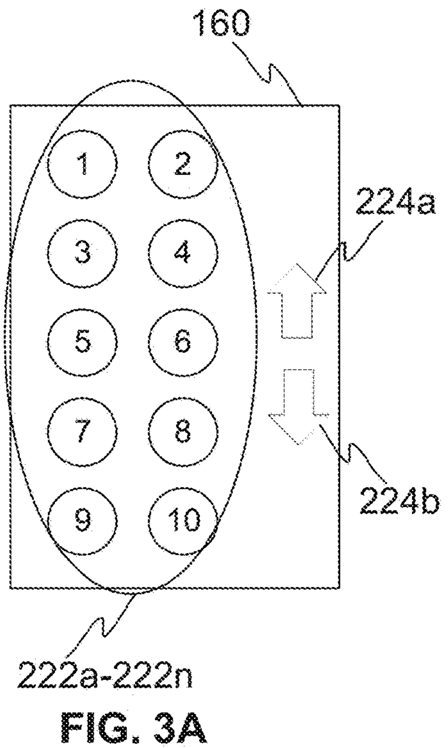
FIGS. 3A-3C illustrate schematically examples the operational entity according to the invention.
Figure 3B:
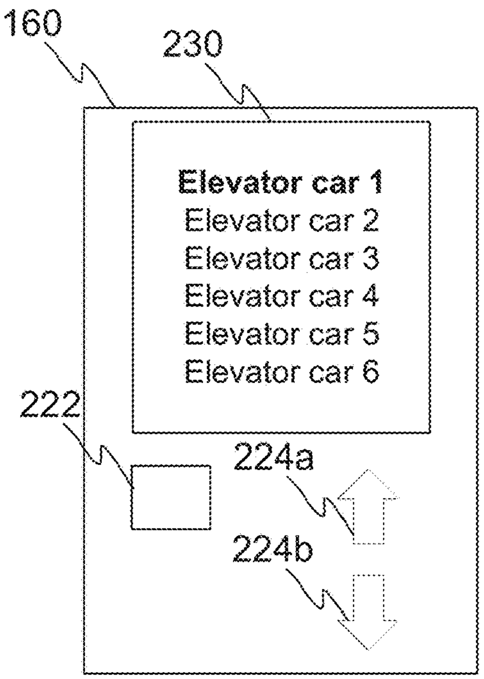
Figure 3C:
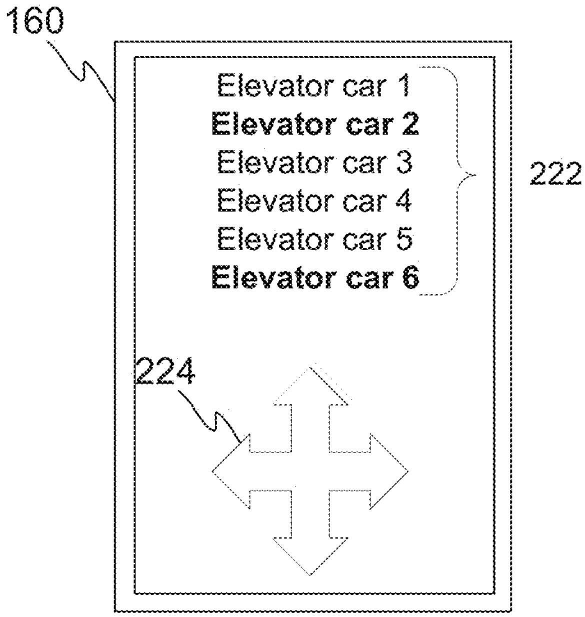

FIGS. 3A-3C illustrates some non-limiting simple examples of the operational entity 160 to illustrate at least some operations of the operational entity 160 according to the invention. In the example operational entity 160 illustrated in FIG. 3A the first input element 222*a*-222*n* of the user interface 210 is implemented as a keypad comprising a button representing each elevator car, e.g. button 1 represents elevator car 1, button 2 represents elevator car 2, etc., and the second input element 224*a*, 224*b* of the user interface 210 is implemented as a keypad comprising buttons for representing possible movement directions, i.e. upwards and downwards in this example. In this example the multicar elevator system 100 comprises 10 elevator cars, but the invention is not limited to that and the multicar elevator system 100 may comprise any number of elevator cars. The indication of selection of at least one elevator car to be moved may be generated in response to continuous or single activation of one of the buttons 222*a*-222*n*, i.e. the first input element 222. Furthermore, the one or more control signals indicative of a request to control the movement of the selected at least one elevator car to a predefined direction may be generated in response to continuous or single activation of the one of the buttons 224*a*,224*b*, i.e. the second input element 224. For example, if elevator cars 1 and 4 are needed to be moved simultaneously upwards, the activation of the buttons of first input element 222 representing elevator car 1 and elevator car 4 generates an indication of selection of the elevator cars 1 and 4 to be moved and the activation, e.g. continuous activation, of the button of second input element representing upwards movement 224*a* generates one or more control signals indicative of a request to control the movement of the elevator car 1 and elevator car 4 upwards. In response to inactivate, i.e. released, the second input element 224*a* one or more control signals indicative of a request to stop the movement of the elevator cars 1 and 4 are generated, i.e. the movement of the elevator cars 1 and 4 stops in response to inactivation of the second input element 224*a*.

In the example operational entity 160 illustrated in FIG. 3B the first input element 222 of the user interface 210 is implemented as a selector button or scroll 222 for selecting at least one elevator car from among the plurality of elevator cars illustrated on the display 230 of the user interface 210 and the second input element 224 of the user interface 210 is implemented as a keypad comprising buttons 224*a*, 224*b* representing possible movement directions, i.e. upwards and downwards in this example. In this example the multicar elevator system 100 comprises 6 elevator cars, but the invention is not limited to that and the multicar elevator system 100 may comprise any number of elevator cars. The indication of selection of at least one elevator car to be moved may be generated in response to continuous or single activation of the first input element 222. Furthermore, the one or more control signals indicative of a request to control the movement of the selected at least one elevator car to a predefined direction may be generated in response to continuous or single activation of the one of the buttons 224*a*, 224*b*, i.e. the second input element 224. For example, if elevator cars 1 and 4 are needed to be moved each at a time so that the elevator car 1 is moved first downwards and after that the elevator car 4 is moved upwards, the selector button or scroll 222 is used first to select the elevator car 1 from the list illustrated on display 230, i.e. the this example the bolded text indicates that selector is on the place of the elevator car 1, and the continuously activation of the selector button or scroll, i.e. the first input element 222 at the place of the elevator car 1 generates an indication of selection of the elevator car 1 to be moved and the activation, e.g. continuous activation, of the button 224*b*, i.e. second input element 224, representing downwards movement generates one or more control signals indicative of a request to control the movement of the elevator car 1 downwards. In response to inactivate, i.e. released, the second input element 224*b* one or more control signals indicative of a request to stop the movement of the elevator car 1 is generated, i.e. the movement of the elevator car 1 stops in response to inactivation of the second input element 224*b*. Next the selector button or scroll 222 is used to select the elevator car 4 from the list illustrated on display 230, i.e. the bolded text indicates that selector is on the place of the elevator car 4, and the continuously activation of the selector button or scroll, i.e. first input element 222 at the place of the elevator car 4 generates an indication of selection of the elevator car 1 to be moved and the activation, e.g. continuous activation, of the button 224*b*, i.e. the second input element representing upwards movement generates one or more control signals indicative of a request to control the movement of the elevator car 4 upwards. In response to inactivate, i.e. released, the first input element 222 and/or the second input element 224*b* one or more control signals indicative of a request to stop the movement of the elevator car 4 is generated, i.e. the movement of the elevator car 4 stops in response to inactivation of the first input element 222 and/or the second input element 224*b*.

In the example operational entity 160 illustrated in FIG. 3C the first input element 222 of the user interface 210 is implemented as a touchscreen representing a list of the plurality of elevator cars from among the at least one elevator car may be selected and the second input element 224 of the user interface 210 is implemented as a touchscreen representing arrow buttons for possible movement directions, i.e. upwards, downwards, left and right in this example. The elevator car may be moved upwards and/or downwards inside vertical elevator shafts 122*a*, 122*b* and/or vertical reservation channel. The elevator car may be moved left and/or right inside horizontal sections, e.g. transfer channels 124*a*, 124*b* and/or horizontal reservation channel, such as the reservation channel 126 in FIG. 1. In this example the multicar elevator system 100 comprises 6 elevator cars, but the invention is not limited to that and the multicar elevator system 100 may comprise any number of elevator cars. The indication of selection of at least one elevator car to be moved may be generated in response to continuous or single activation of the first input element 222. Furthermore, the one or more control signals indicative of a request to control the movement of the selected at least one elevator car to a predefined direction may be generated in response to continuous or single activation of the one of the second input element 224. For example, if elevator cars 2 and 6 are needed to be moved simultaneously upwards, the activation of the touchscreen of first input element 222 at a place representing elevator car 2 and elevator car 6 generates an indication of selection of the elevator cars 2 and 6 to be moved. The activation may be for example a touch by user at the places representing the elevator cars 2 and 6. The selected elevator cars 2 and 6 are illustrated as a bolded text in this non-limiting example. The activation, e.g. continuous activation, of the touchscreen of the second input element 224 at the place representing upwards movement generates one or more control signals indicative of a request to control the movement of the elevator car 2 and elevator car 6 upwards. In response to inactivate, i.e. released, the second input element 224 one or more control signals indicative of a request to stop the movement of the elevator cars 2 and 6 are generated, i.e. the movement of the elevator cars 2 and 6 stops in response to inactivation of the second input element 224.

Above it is described an operational entity according to the present invention with different embodiments. Moreover, the present invention relates to a multicar elevator system. The multicar elevator system comprises a plurality of elevator cars and an elevator control unit for controlling operation of the multicar elevator system at least in part. The multicar elevator system comprises also an operational entity as described above.

The above described operational entity of a multicar elevator system provides advantages compared to prior art solutions at least in that the operational entity enables controlling the movement of a plurality of elevator cars via one operational entity.

The specific examples provided in the description given above should not be construed as limiting the applicability and/or the interpretation of the appended claims. Lists and groups of examples provided in the description given above are not exhaustive unless otherwise explicitly stated.

The invention claimed is:

1. An operational entity for controlling movement of a plurality of elevator cars of a multicar elevator system, the operational entity having a user interface comprising a first input element and a second input element, the user interface is configured to:

generate, based on continuous activation of the first input element, an indication of selection of at least one elevator car from among the plurality of elevator cars to be moved, and generate, in response to continuous activation of the second input element simultaneously with the continuous activation of the first input element, one or more control signals indicative of a request to control movement of the selected at least one elevator car in a predefined direction.

2. The operational entity according to claim 1, wherein the user interface is configured to:

generate, in response to inactivation of the first input element and/or the second input element, one or more control signals indicative of a request to stop the movement of the selected at least one elevator car.

3. The operational entity according to claim 1, wherein the generated indication of selection of at least one elevator car comprises indication of substantially simultaneous selection of two or more elevator cars from among the plurality of elevator cars, and the generated one or more control signals comprises indication of a request to control movement of the selected two or more elevator cars simultaneously.

4. The operational entity according to claim 1, wherein the generated indication of selection of at least one elevator car comprises indication of selection of two or more elevator cars from among the plurality of elevator cars each at respective different times, and the generated one or more control signals comprises indication of a request to control movement of the selected two or more elevator cars at the different respective times.

5. The operational entity according to claim 1, wherein the operational entity is one of: a test and emergency panel arranged outside an elevator shaft, an inspection drive station arranged inside the elevator shaft, and a mobile device.

6. The operational entity according to claim 1, wherein the user interface further comprises a display configured to display simultaneously location and/or movement information of the plurality of elevator cars.

7. The operational entity according to claim 6, wherein the user interface further comprises a display configured to display simultaneously location and/or movement information of a plurality of selected elevator cars.

8. The operational entity according to claim 1, wherein the generated one or more control signals are provided to an elevator control unit of the multicar elevator system.

9. The multicar elevator system for controlling movement of the plurality of elevator cars of the multicar elevator system, comprising:

the plurality of elevator cars, an elevator control unit configured to control operation of the multicar elevator system at least in part, and the operational entity according to claim 1.

10. The operational entity according to claim 1, wherein the second input element comprises buttons representing possible movement directions of the selected at least one elevator car.

11. An operational entity for controlling movement of a plurality of elevator cars of a multicar elevator system, the operational entity having a user interface comprising a first input element and a second input element, the user interface is configured to:

generate, in response to activation of the first input element, an indication of selection of at least one elevator car from among the plurality of elevator cars to be moved, generate, in response to first activation of the second input element, one or more control signals to an elevator control unit indicative of a request to control movement of the selected at least one elevator car in a predefined direction, and generate, in response to second activation of the second input element, one or more control signals to the elevator control unit indicative of a request to stop the movement of the selected at least one elevator car.

12. The operational entity according to claim 11, wherein the second input element comprises buttons representing possible movement directions of the selected at least one elevator car.

13. An operational entity for controlling movement of a plurality of elevator cars of a multicar elevator system, the operational entity having a user interface including a first input element and a second input element, the user interface configured to:

generate one or more control signals indicative of selection of at least one elevator car from among the plurality of elevator cars for movement, based on activation of the first input element by a user of the multicar elevator system, generate one or more control signals indicative of a request to control directional movement of the selected at least one elevator car in a desired direction, based on activation of the second input element by the user of the multicar elevator system, and generate one or more control signals indicative of a request to stop directional movement of the selected at least one elevator car in the desired direction, based on deactivation of at least one of the first input element and the second input element by the user of the multicar elevator system, wherein the activation of the first input element is a single activation of the first input element, and the activation of the second input element is a first single activation of the second input element, and wherein the deactivation comprises a second single activation of the second input element.

14. The operational entity according to claim 13, wherein the user interface further includes an output device configured to display location and directional movement of the at least one elevator car.

15. The operational entity according to claim 13, configured as a test and emergency panel arranged outside an elevator shaft of the multicar elevator system.

16. The operational entity according to claim 13, configured as an inspection drive station arranged inside an elevator shaft of the multicar elevator system.

17. The operational entity according to claim 13, wherein the second input element comprises buttons representing possible movement directions of the selected at least one elevator car.

* * * * *